United States Patent [19]

Blair

[11] Patent Number: 5,069,278
[45] Date of Patent: Dec. 3, 1991

[54] LEAKAGE CONTROL DEVICE

[75] Inventor: John Blair, Alberta, Canada

[73] Assignee: Paul Blair, Edmonton, Canada

[21] Appl. No.: 577,515

[22] Filed: Sep. 4, 1990

[51] Int. Cl.⁵ .................... E21B 43/00; F04B 35/00
[52] U.S. Cl. ............................... 166/68; 166/88; 277/134; 417/424.1
[58] Field of Search ............... 166/68, 68.5, 72, 82, 166/84, 86, 88, 75.1, 105, 369; 277/133, 134, 67; 417/424.1

[56] References Cited

U.S. PATENT DOCUMENTS

| 823,077 | 6/1906 | Pitman | 277/133 X |
|---|---|---|---|
| 1,504,658 | 8/1924 | Ulmer | 277/134 X |
| 1,826,057 | 10/1931 | Dobbins | 277/134 X |
| 2,089,377 | 8/1937 | Jehl | 277/134 X |
| 2,350,448 | 6/1944 | Collins | 277/133 X |
| 3,891,031 | 6/1975 | Ortiz | 166/68.5 |
| 4,372,379 | 2/1983 | Kulhanek et al. | 166/68.5 |
| 4,716,961 | 1/1988 | Makins, Jr., et al. | 166/68.5 |

Primary Examiner—Stephen J. Novosad

[57] ABSTRACT

A seal enhancement assembly according to the present invention cooperates with the traditional static seals to reduce leakage. Leakage often occurs along the drive shaft which passes through the static seal. This is a particular problem in screw pump lift systems used in oil wells. This leakage problem is reduced by means of a pumping member secured on the drive shaft before the static seal which urges the fluid away from the seal. Rotation of the drive shaft produces this pumping action and protection of the static seal.

13 Claims, 3 Drawing Sheets

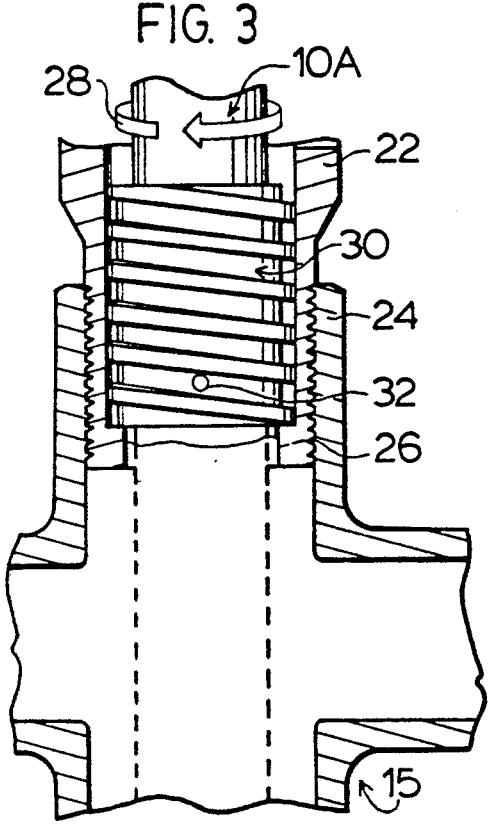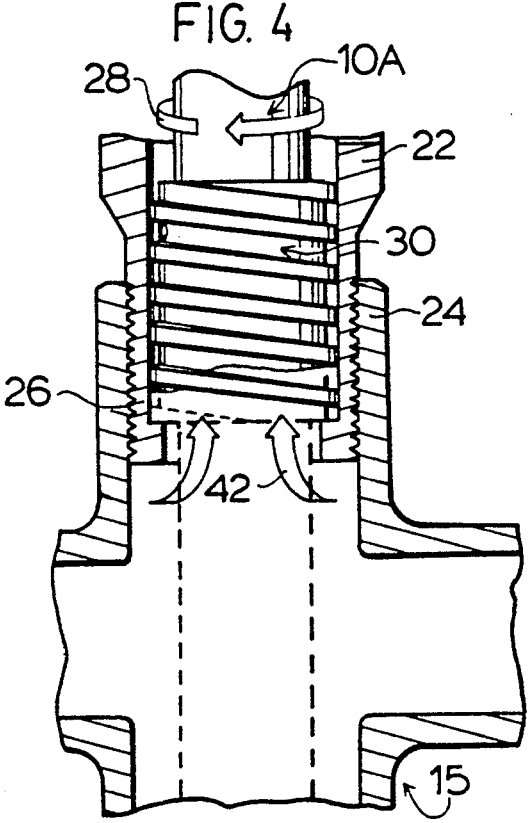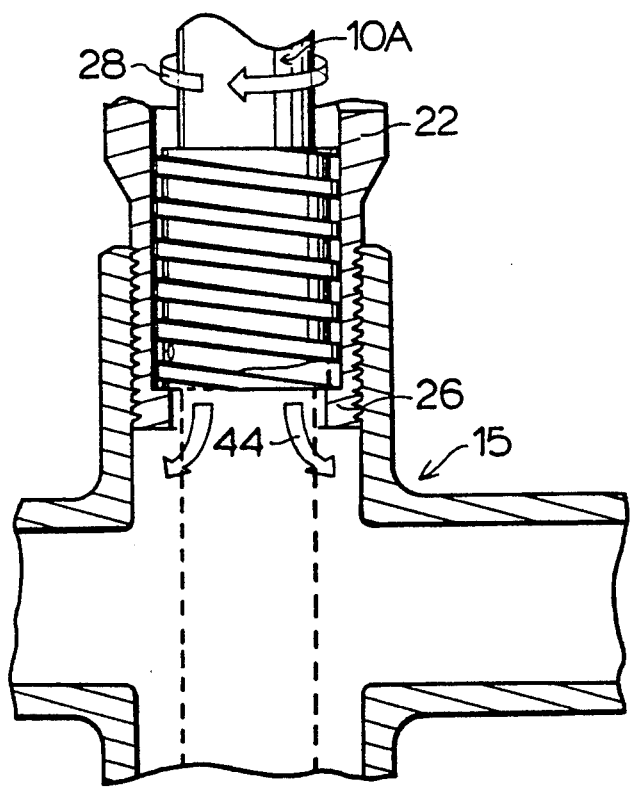

LEAKAGE CONTROL DEVICE

FIELD OF THE INVENTION

The present invention relates to pumping arrangements and in particular, relates to sealing arrangements for well head stuffing box assembly.

BACKGROUND OF THE INVENTION

Various pumping arrangements have been used for oil wells and one particular system involves the use of a screw pump lift system. In such systems, the well drive brings oil, sand and water up the tubing from the bottom of the well. Above the wellhead, the flow is typically redirected by means of a flow "T". The well polish rod extends out through the flow "T" and a stuffing box provides the seal therefore. Unfortunately the stuffing box, often cannot stop all of the fluid following the polished shaft that is used to drive the pump. Thus, leakage occurs at the polish rod and oil accumulates on the wellhead that has to be continuously cleaned up. Furthermore the packing has to be changed frequently whereby a high service cost is incurred. The type of fluid being pumped, i.e. an oil or a fluid or material having oil therein, and the use of the drive shaft which is of a polished steel, in combination with the continuous operation of such a pump for an oil well, contributes to the problem and stationary seals have not proven satisfactory.

There remains a need to provide a simple solution for overcoming the difficulties outlined above.

SUMMARY OF THE INVENTION

The present invention is directed to an improved pumping arrangement. The pumping arrangement generally has a drive shaft, a fitting for directing the flow of fluid and through which the drive shaft extends, a seal arrangement for limiting the flow of liquid from the fitting along the polish rod, as well as a seal enhancement assembly designed to control leakage of fluid from the pumping arrangement along the polish rod. This seal enhancement assembly is disposed intermediate the fitting and the sealing arrangement. The seal enhancement assembly has an outer casing through which the polish rod extends and a threaded member driven by the polish rod and cooperating with the casing to direct fluid into the fitting when the polish rod is driven in its intended operative manner. Such an arrangement recognizes that static seals are not sufficient and provides a threaded member with an appropriate thread for urging any fluid which is trying to move along the drive shaft back into the fitting. Thus, a pumping type action is provided or a pumping bias, such that oil does not immediately contact the traditional sealing arrangement. In this way, the pressures exerted on the traditional seals are reduced and the demands of the stationary seal are reduced.

BRIEF DESCRIPTION OF THE DRAWINGS

Preferred embodiments of the invention are shown in the drawings, wherein:

FIGS. 3 through 5 are various sectional views showing the pumping action of the threaded member of the seal enhancement assembly.

DETAILED DESCRIPTION OF THE PREFERRED EMBODIMENTS

Figure 1:
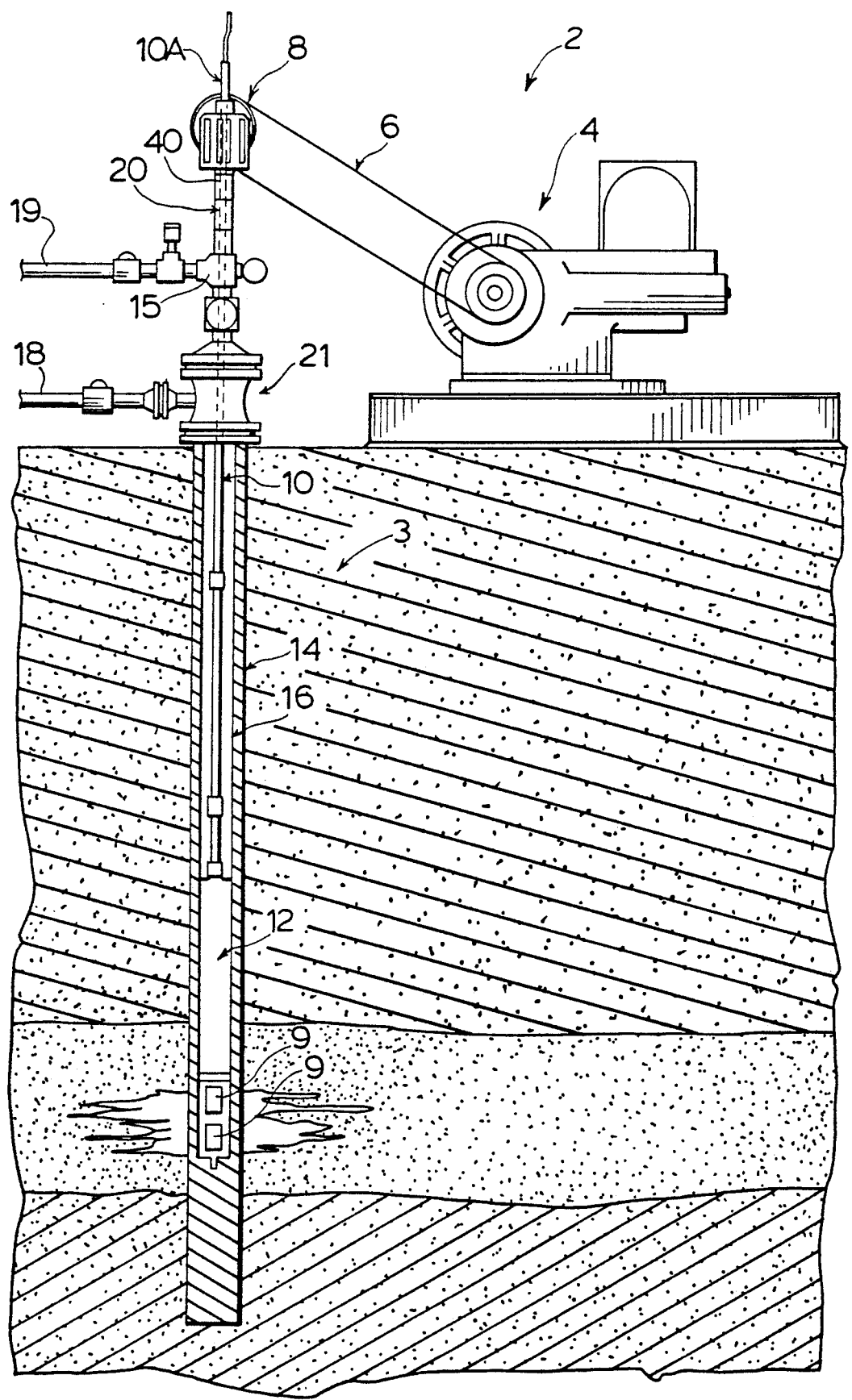
FIG. 1 is a partial schematic view a screw pump lift system for an oil well.
Figure 2:
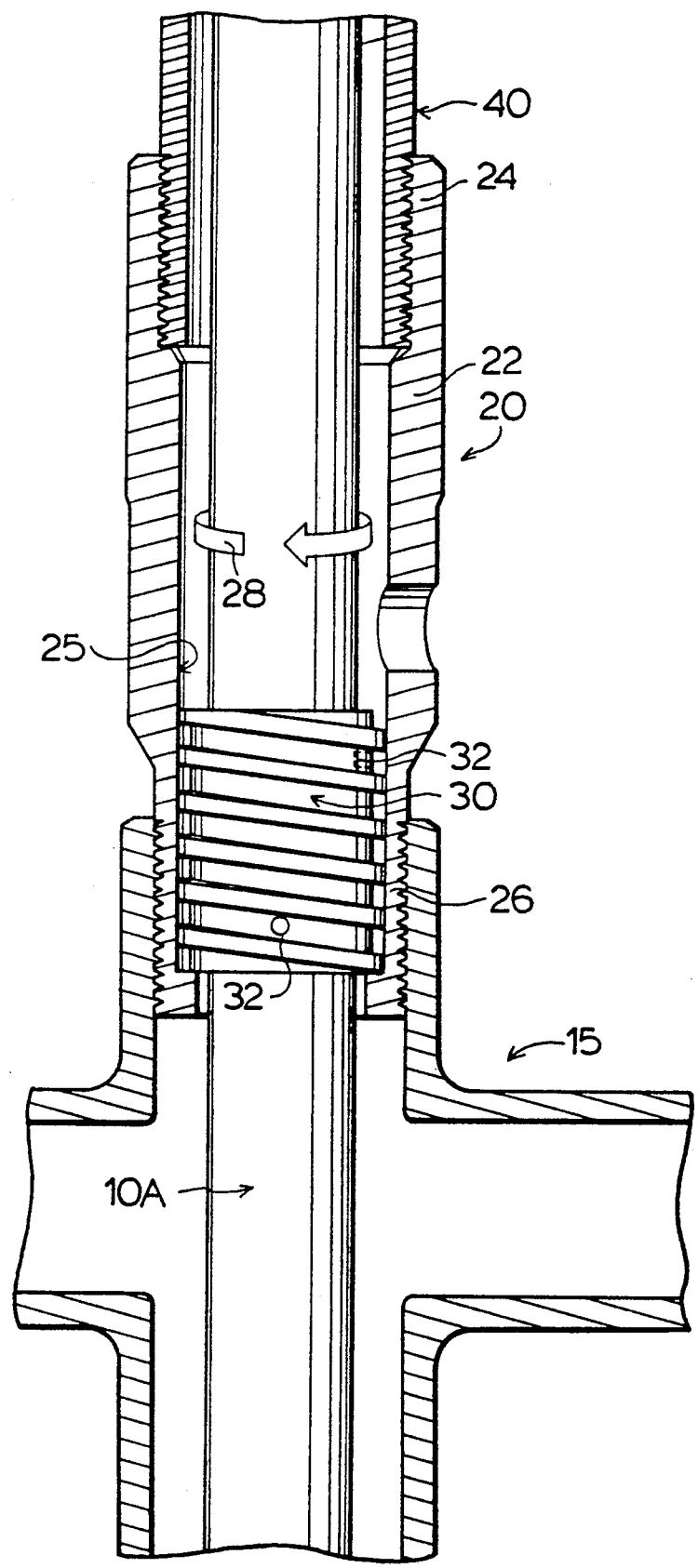
FIG. 2 is a sectional view through the 'T' fitting which has been adapted with the seal enhancement assembly.

A typical screw pump lift system 2 is shown in FIG. 1 having a prime mover 4, a drive belt 6 operatively driving the pulley and gear arrangement 8. The pump arrangement includes a polish rod 10A connected to a drive shaft 10, or what is often referred to as "sucker rods" 10, for driving of the bottom hole pump assembly 12. The oil well 3, includes a casing 14 having inserted therein the pump tubing 16. Oil, gas, sand, water, etc. enters the pump arrangement through access ports 9 located in the bottom of the bottom hole pump assembly 12. This material is forced up the tubing by the pump 16 to the wellhead 21. At this point, gas may be taken off through line 18, whereas oil and sand, etc. is removed for further processing through outlet line 19. The flow "T", generally shown as 15, is connected to the oil outlet line 19. As can be appreciated, the polish rod 10A passes up through the wellhead 21 and through the flow "T" 15 and is connected to the pulley and gear arrangement, generally shown as 8. The seal enhancement assembly of the present invention is shown within the system as item 20 and a traditional stuffing box or other static type seal arrangement is shown as 40.

The seal enhancement assembly 20 includes a casing part 22 having a threaded port, generally shown as 24, for connection with the stuffing box 40. The polish rod 10 passes up through the casing and a small cylinder portion 25 is located in the bottom of the seal enhancement assembly 20. Within this cylinder port 25, a threaded member 30 is provided with a thread pitch and direction designed to urge any fluid which comes in contact therewith towards the flow "T" 15. The threaded member 30 has a tight fit with the polish rod 10A, or may have an effective seal thereabout, and is held on the shaft to be driven therewith by means of a set screw or set screws 32. The bottom of the casing member 22 has a threaded portion 26 having exterior threads for receipt within a threaded port of the flow "T" 15. With rotation of the polish rod in the direction generally indicated by arrow 28, any fluid or oil in contact with the lower surface of the threaded member 30 which has passed through the flow "T" 15 is effectively pumped due to the lefthand thread of the threaded member 30 back into the flow "T" 15. Similarly any fluid which has passed the threaded member 30 and is limited by the stuffing box is also returned or urged to the flow "T".

As can be appreciated, if the drive shaft was driven in the reverse direction, the thread direction on threaded member 30 would also be reversed. Therefore, with the normal rotation of the drive shaft, as indicated by 28, a lefthand thread would be used such that the pumping action urging the fluid to the flow "T" occurs. With this arrangement, oil which enters the flow "T" due to the pumping action of the bottom hole pump assembly 12 strikes the threaded member 30, as generally indicated in FIG. 4. Arrows 42 illustrate the traditional flow of oil along the polish rod 10A towards the static sealing arrangement 40. Once this fluid comes in contact with the threaded member and due to rotation of the polish rod, as indicated by 28, the threaded member 30 serves to pump the oil which comes in contact therewith back into the flow "T" 15 or urge the fluid in this direction.

This action is shown in FIG. 5 where the threaded member has been rotated a certain limited degree and a pumping of the oil back into the fitting has occurred. This dynamic type pumping arrangement for limiting the flow of fluid along the polish rod 10A reduces the requirements on the static sealing arrangement 40 and has greatly reduced the required maintenance of such static seals and the required maintenance of well heads using this type of pumping arrangement.

Although the invention has been particularly described with respect to oil pumping arrangements, it may have application in other pumping applications, particularly where seals are required between a rotating drive shaft and the actual fluid being pumped.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In a wellhead pumping arrangement having a drive shaft, a fitting for directing the flow of a fluid and through which the drive shaft extends, a stuffing box arrangement for limiting the flow of liquid from said fitting along said drive shaft, the improvement comprising a seal enhancement assembly designed to control leakage of fluid between said drive shaft and said stuffing box arrangement, said seal enhancement assembly being disposed intermediate said fitting and said stuffing box arrangement, said seal enhancement assembly having an outer casing through which said drive shaft extends and a rotary member driven by said shaft and cooperating with said casing to urge fluid in contact with said rotary member or said stuffing box arrangement away from said stuffing box arrangement and into said fitting when said drive shaft is driven in its intended operative manner thereby reducing the fluid pressure exerted on said stuffing box to a level substantially below the operating pressure of said wellhead.

2. In a pumping arrangement as claimed in claim 1 wherein said rotary member has an exterior threaded portion by means of which fluid is urged away from said stuffing box arrangement with normal rotation of said drive shaft.

3. In a pumping arrangement as claimed in claim 2 wherein said threaded portion of said rotary member is of a left hand thread.

4. In a pumping arrangement as claimed in claim 3 wherein rotary member is secured to said drive shaft by means of set screws passing through said rotary member.

5. In a pumping arrangement as claimed in claim 3 wherein said rotary member cooperates with said stuffing box arrangement to reduce the fluid pressure exerted on said stuffing box arrangement by urging said fluid towards said fitting and away from said stuffing box arrangement.

6. In a pumping arrangement as claimed in claim 1 wherein said rotary member is made of a material selected from the group consisting of steel, brass, aluminum and nylons.

7. In a wellhead pumping arrangement as claimed in claim 1 wherein said rotary member is made of a nylon material.

8. A seal enhancement assembly for controlling leakage of crude oil at the wellhead for multiple speed rotary helical application comprising a casing with a cylindrical chamber and a rotary cylindrical member tightly fitted within said chamber, said rotary cylindrical member having a centrally disposed port for receiving a drive shaft and means for securing said rotary cylindrical member to the drive shaft, said casing being closed by a stuffing box on one side of said rotary cylindrical member and generally open on the other side of said rotary cylindrical member, said rotary cylindrical member including fluid displacement means thereon which cause, in one direction of rotation of said rotary cylindrical member, an action urging any fluid within said casing to move through said open end and thereby reduce the pressure exerted on the stuffing box to a pressure substantially lower than the pressure of the wellhead and reduce leakage through said stuffing box.

9. A seal enhancement assembly for controlling leakage of crude oil at the wellhead for multiple speed rotary helical application as claimed in claim 8 wherein said rotary cylindrical member has a threaded exterior surface defining said fluid displacement surface.

10. A seal enhancement assembly for controlling leakage of crude oil at the wellhead for multiple speed rotary helical application as claimed in claim 9 wherein said threaded portion is a lefthand thread and the operational direction of rotation of said drive shaft is of a right hand orientation.

11. A seal enhancement assembly for controlling leakage of crude oil at the wellhead for multiple speed rotary helical application as claimed in claim 9 wherein said threaded portion has a thread direction opposite the operational direction of said drive shaft.

12. A seal enhancement assembly for controlling leakage of crude oil at the wellhead for multiple speed rotary helical application as claimed in claim 8 wherein said rotary cylindrical member is made of a material selected from the group consisting of steel, brass, aluminum and nylons.

13. A seal enhancement assembly for controlling leakage of crude oil at the wellhead for multiple speed rotary helical application as claimed in claim 8 wherein said casing is made of alloy steel.

* * * * *